United States Patent
Moteki et al.

(10) Patent No.: US 11,472,398 B2
(45) Date of Patent: Oct. 18, 2022

(54) HYBRID VEHICLE

(71) Applicant: TOYOTA JIDOSHA KABUSHIKI KAISHA, Toyota (JP)

(72) Inventors: Taro Moteki, Susono (JP); Kenji Itagaki, Sunto-gun (JP); Koichi Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 16/957,764

(22) PCT Filed: Dec. 25, 2018

(86) PCT No.: PCT/JP2018/047676
§ 371 (c)(1),
(2) Date: Jun. 25, 2020

(87) PCT Pub. No.: WO2019/150854
PCT Pub. Date: Aug. 8, 2019

(65) Prior Publication Data
US 2021/0309208 A1 Oct. 7, 2021

(30) Foreign Application Priority Data

Jan. 30, 2018 (JP) .............................. JP2018-013999

(51) Int. Cl.
*B60W 20/17* (2016.01)
*B60K 6/24* (2007.10)
(Continued)

(52) U.S. Cl.
CPC ............... *B60W 20/17* (2016.01); *B60K 6/24* (2013.01); *B60K 6/26* (2013.01); *B60L 15/20* (2013.01);
(Continued)

(58) Field of Classification Search
CPC ....... B60W 20/17; B60W 10/06; B60W 10/08
See application file for complete search history.

(56) References Cited

U.S. PATENT DOCUMENTS 6,907,325 B1 * 6/2005 Syed ...................... B60W 20/11
701/22
9,573,588 B2 * 2/2017 Aoki ..................... F02D 41/042
(Continued)

FOREIGN PATENT DOCUMENTS

DE 10 2007 055 727 A1 7/2008
DE 11 2010 005 653 B4 2/2019
(Continued)

*Primary Examiner* — Jeffrey J Restifo
(74) *Attorney, Agent, or Firm* — Oliff PLC

(57) ABSTRACT

A hybrid vehicle including: an engine; output member that transmits driving force to drive wheels; a rotating electric machine; and a power split mechanism that splits and transmits the driving force output from the engine to the output member and the rotating electric machine, the mechanism including at least three rotating elements of an input element connected to the engine, a reaction force element connecting the rotating electric machine, and an output element connecting the output member, the machine capable of outputting reaction force torque to required engine torque based on an acceleration request to apply torque to the required engine torque to the drive wheel, where the machine does not output the reaction force torque, engine rotation speed increase control being able to be executed, engine torque limitation due to a NV requirement being able to be executed and which is relaxed during the engine rotation speed increase control.

2 Claims, 5 Drawing Sheets

(51) Int. Cl.
  *B60K 6/26* (2007.10)
  *B60L 15/20* (2006.01)
  *B60W 10/06* (2006.01)
  *B60W 10/08* (2006.01)

(52) U.S. Cl.
  CPC ............ *B60W 10/06* (2013.01); *B60W 10/08* (2013.01); *B60Y 2200/92* (2013.01); *B60Y 2400/435* (2013.01)

(56) References Cited

U.S. PATENT DOCUMENTS

| | | | | |
|---|---|---|---|---|
| 9,827,989 | B1* | 11/2017 | Saxman | B60W 30/18 |
| 2008/0122391 | A1* | 5/2008 | Iwase | B60W 10/06 318/460 |
| 2013/0073134 | A1* | 3/2013 | Yokouchi | B60W 20/17 903/902 |
| 2014/0248991 | A1* | 9/2014 | Harada | B60W 20/40 477/3 |
| 2016/0108831 | A1* | 4/2016 | Chun | B60W 20/40 903/905 |
| 2016/0159340 | A1* | 6/2016 | Chung | B60W 10/08 903/906 |
| 2016/0201586 | A1* | 7/2016 | Serrano | F02D 41/1498 701/111 |
| 2016/0257299 | A1* | 9/2016 | Ikedaya | B60K 6/442 |
| 2016/0304084 | A1* | 10/2016 | Kawai | B60K 6/445 |
| 2017/0166187 | A1* | 6/2017 | Eo | B60K 6/485 |
| 2017/0166188 | A1* | 6/2017 | Kim | B60W 40/12 |
| 2017/0166189 | A1* | 6/2017 | Eo | B60W 10/06 |
| 2017/0166190 | A1* | 6/2017 | Eo | B60W 40/12 |
| 2017/0210375 | A1* | 7/2017 | Orlamünder | B60L 50/66 |
| 2018/0202379 | A1* | 7/2018 | Nagashima | F02D 41/1497 |
| 2019/0031178 | A1* | 1/2019 | Liu | B60K 6/543 |
| 2019/0184959 | A1* | 6/2019 | Cao | B60W 10/06 |
| 2019/0232949 | A1* | 8/2019 | Takasu | B60K 6/445 |
| 2019/0308640 | A1* | 10/2019 | Miller | F02D 13/0234 |
| 2019/0344776 | A1* | 11/2019 | Bidarvatan | B60K 6/46 |
| 2020/0010089 | A1* | 1/2020 | Ford | B60W 10/026 |
| 2020/0039502 | A1* | 2/2020 | Momose | B60W 20/15 |
| 2020/0055513 | A1* | 2/2020 | Galang | B60W 50/14 |
| 2020/0070809 | A1* | 3/2020 | Alcantar | B60W 10/08 |
| 2020/0180600 | A1* | 6/2020 | Srivastava | B60K 6/48 |
| 2020/0331454 | A1* | 10/2020 | An | B60W 30/20 |
| 2021/0086776 | A1* | 3/2021 | Park | B60K 17/02 |
| 2021/0107485 | A1* | 4/2021 | Tabata | B60K 6/365 |
| 2022/0120230 | A1* | 4/2022 | Wilcutts | F01N 3/101 |

FOREIGN PATENT DOCUMENTS

| | | |
|---|---|---|
| DE | 11 2016 000 318 B4 | 10/2019 |
| JP | H11-69507 A | 3/1999 |
| JP | 2009-143314 A | 7/2009 |
| JP | 2013-086600 A | 5/2013 |
| WO | 2013/171841 A1 | 11/2013 |

\* cited by examiner

HYBRID VEHICLE

FIELD

The present invention relates to a hybrid vehicle.

BACKGROUND

Patent Literature 1 discloses that in a hybrid vehicle, an engine operating point is controlled so as to avoid a noise vibration (NV) restriction region.

CITATION LIST

Patent Literature

Patent Literature 1: Japanese Laid-open Patent Publication No. 2013-86600

SUMMARY

Technical Problem

However, in a hybrid vehicle as disclosed in Patent Literature 1, when engine rotation speed increase control of increasing an engine rotation speed is to be executed in a situation where a motor generator does not output reaction force torque and torque is not output to an output shaft, an increase in engine rotation speed may be delayed due to the NV restriction region, and the acceleration responsiveness may be deteriorated.

The present invention has been made in view of the above problem, and has an object to provide a hybrid vehicle capable of suppressing a delay in increasing an engine rotation speed due to an NV restriction region.

Solution to Problem

To resolve the above problem and attain the object, a hybrid vehicle according to the present invention includes: an engine; an output member that transmits a driving force to a drive wheel; a rotating electric machine; and a power split mechanism that splits and transmits the driving force output from the engine to the output member and the rotating electric machine, the power split mechanism including at least three rotating elements of an input element connected to the engine, a reaction force element connected to the rotating electric machine, and an output element connected to the output member, the rotating electric machine being configured to be capable of outputting a reaction force torque corresponding to required engine torque based on an acceleration request in order to apply a torque corresponding to the required engine torque to the drive wheel, in a situation where the rotating electric machine does not output the reaction force torque, engine rotation speed increase control of increasing an engine rotation speed being able to be executed, engine torque limitation due to a NV requirement being able to be executed. Further, the engine torque limitation due to the NV requirement is relaxed during the engine rotation speed increase control.

Further, in the above invention, the engine may include a supercharger, and an output torque of the engine may be increased by operating the supercharger.

As a result, the engine rotation speed can be quickly increased in order to rotate a turbine of the supercharger.

Advantageous Effects of Invention

The hybrid vehicle according to the present invention has an effect that a delay in increasing the engine rotation speed due to the NV restriction region can be suppressed by relaxing the engine torque limitation due to the NV requirement during the engine rotation speed increase control.

DESCRIPTION OF EMBODIMENTS

Hereinafter, an embodiment of a hybrid vehicle according to the present invention will be described. Note that the present invention is not limited by the present embodiment.

Figure 1:
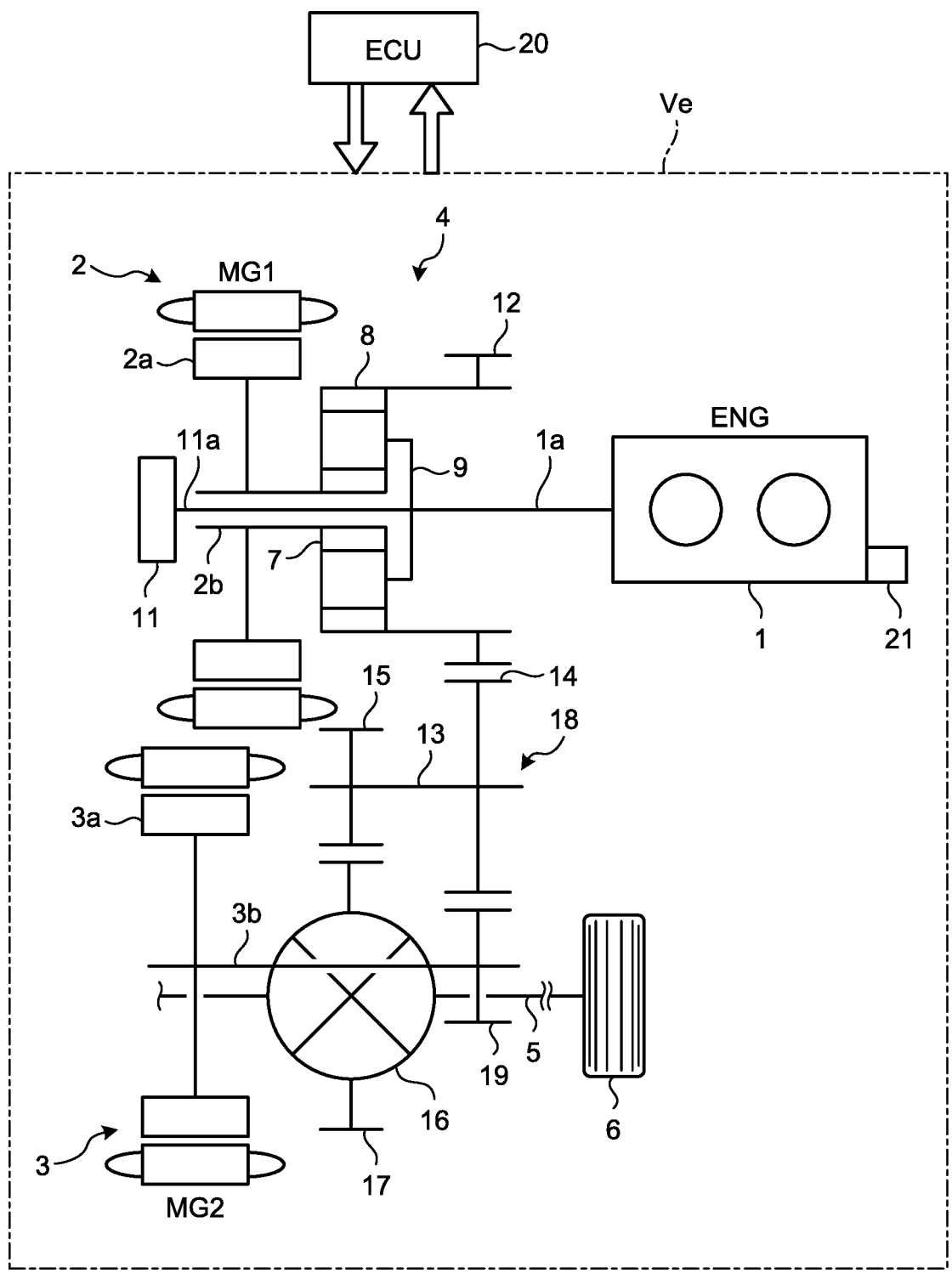
FIG. 1 is a skeleton diagram illustrating an example of a power train of a hybrid vehicle.

FIG. 1 is a skeleton diagram illustrating an example of a power train of a hybrid vehicle Ve. The hybrid vehicle Ve includes a plurality of driving power sources including an engine (ENG) 1 as a main motor, a first motor generator (MG1) 2 as a rotating electric machine, and a second motor generator (MG2) 3 as a rotating electric machine. The hybrid vehicle Ve is configured to split and transmit power output from the engine 1 to the first motor generator 2 side and a drive shaft 5 side as an output shaft by a power split mechanism 4. The power generated by the first motor generator 2 is supplied to the second motor generator 3, and a driving force output by the second motor generator 3 can be added to the drive shaft 5 and a drive wheel 6.

Each of the first motor generator 2 and the second motor generator 3 has both a function as a motor that outputs torque by being supplied with driving power and a function as a generator that generates generated power by being supplied with torque (power generation function). Note that the first motor generator 2 and the second motor generator 3 are electrically connected to a power storage device such as a battery or a capacitor via an inverter or the like (not illustrated), and can be supplied with power from the power storage device and charge generated power to the power storage device.

The power split mechanism 4 is arranged on the same axis as the engine 1 and the first motor generator 2. An output shaft 1a of the engine 1 is connected to a carrier 9 which is an input element of a planetary gear mechanism constituting the power split mechanism 4. The output shaft 1a serves as an input shaft of the power split mechanism 4 in a power transmission path from the engine 1 to the drive wheel 6. A rotation shaft 11a of an oil pump 11 that supplies oil for lubrication and cooling of the power split mechanism 4 and for cooling heat generated by copper loss and iron loss of the first motor generator 2 and the second motor generator 3 is connected to the carrier 9.

The first motor generator 2 is arranged adjacent to the power split mechanism 4 and on the side opposite to the engine 1, and a rotor shaft 2b that rotates integrally with a rotor 2a of the first motor generator 2 is connected to a sun gear 7 which is a reaction force element of the planetary gear mechanism. The rotor shaft 2b and a rotation shaft of the sun gear 7 are hollow shafts. The rotation shaft 11a of the oil pump 11 is arranged in the hollow portions of the rotor shaft 2b and the rotation shaft of the sun gear 7, and the rotation shaft 11a is connected to the output shaft 1a of the engine 1 through the hollow portions.

A first drive gear 12 of an external gear which is an output member is formed integrally with a ring gear 8 on an outer peripheral portion of the ring gear 8 which is an output element of the planetary gear mechanism. Further, a counter shaft 13 is arranged in parallel with the rotation axis of the power split mechanism 4 and the first motor generator 2. A counter driven gear 14 that meshes with the first drive gear 12 is attached to one end of the counter shaft 13 so as to rotate integrally. The counter driven gear 14 is configured to amplify torque transmitted from the first drive gear 12. Meanwhile, a counter drive gear 15 is attached to the other end of the counter shaft 13 so as to rotate integrally with the counter shaft 13. The counter drive gear 15 meshes with a differential ring gear 17 of a differential gear 16. Therefore, the ring gear 8 of the power split mechanism 4 is connected to the drive shaft 5 and the drive wheel 6 so that power can be transmitted via an output gear train 18 including the first drive gear 12, the counter shaft 13, the counter driven gear 14, the counter drive gear 15, and the differential ring gear 17.

The power train of the hybrid vehicle Ve is configured such that the torque output from the second motor generator 3 can be added to the torque transmitted from the power split mechanism 4 to the drive shaft 5 and the drive wheel 6. Specifically, a rotor shaft 3b that rotates integrally with a rotor 3a of the second motor generator 3 is arranged in parallel with the counter shaft 13. A second drive gear 19 that meshes with the counter driven gear 14 is attached to a distal end of the rotor shaft 3b so as to rotate integrally. Therefore, the second motor generator 3 is connected to the ring gear 8 of the power split mechanism 4 via the differential ring gear 17 and the second drive gear 19 so that power can be transmitted. That is, the ring gear 8 is connected to the drive shaft 5 and the drive wheel 6 via the differential ring gear 17 together with the second motor generator 3 so that power can be transmitted.

The hybrid vehicle Ve operates in traveling modes such as a hybrid traveling mode (HV traveling) mainly using the engine 1 as a power source, and an electric traveling mode (EV traveling) in which the first motor generator 2 and the second motor generator 3 are driven to travel by power of the power storage device. Such setting and switching of each traveling mode are executed by an electronic control device (ECU) 20. The ECU 20 is electrically connected to the engine 1, the first motor generator 2, the second motor generator 3 and the like so as to transmit a control command signal. The ECU 20 is mainly configured by a microcomputer, and is configured to perform computation using input data and data and a program stored in advance, and to output a result of the computation as a control command signal. The data input to the ECU 20 includes a vehicle speed, a wheel speed, an accelerator opening, a remaining charge (SOC) of the power storage device and the like. The data stored in the ECU 20 in advance includes a map in which each driving mode is determined, a map in which an optimum fuel consumption operating point of the engine 1 is determined, a map in which required power Pe_req (engine required output) of the engine 1 is determined and the like. The ECU 20 outputs, as control command signals, start and stop command signals of the engine 1, a torque command signal of the first motor generator 2, a torque command signal of the second motor generator 3, a torque command signal of the engine 1 and the like.

Figure 2:
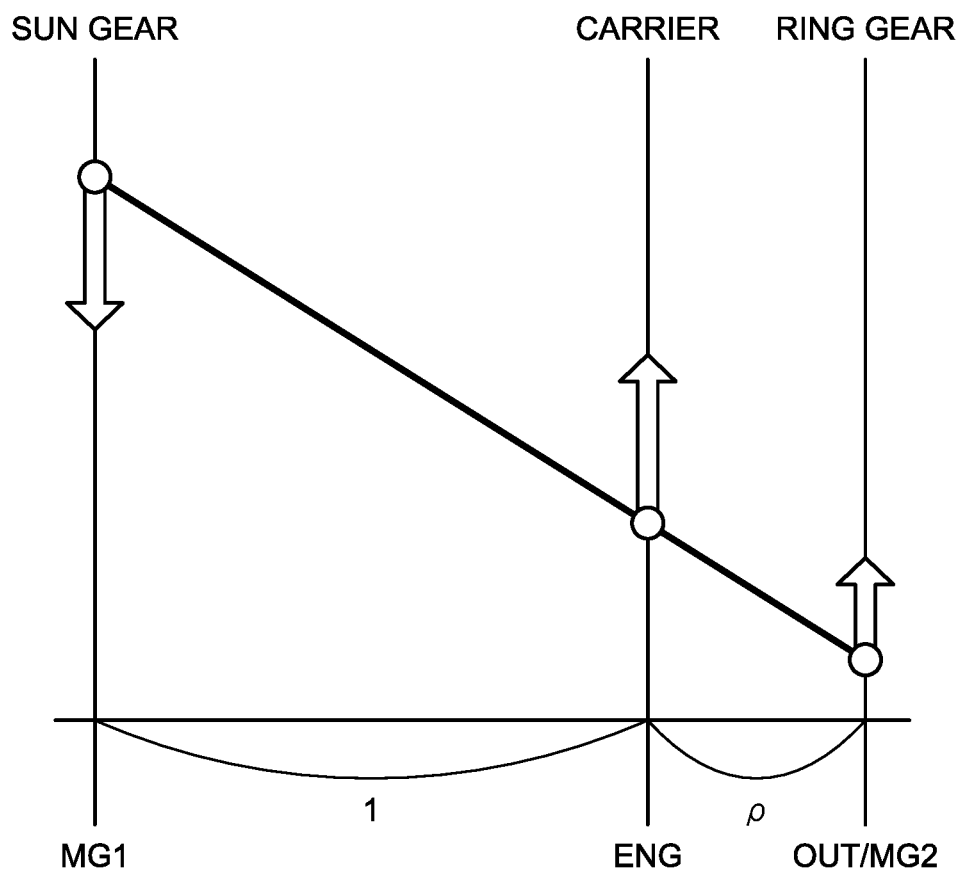
FIG. 2 is an alignment chart of a power split mechanism constituted by a single pinion type planetary gear mechanism of FIG. 1.

FIG. 2 is an alignment chart of the power split mechanism 4 constituted by a single pinion type planetary gear mechanism of FIG. 1. In the alignment chart illustrated in FIG. 2, a vertical line representing the carrier 9 (engine shaft) is located between a vertical line representing the sun gear 7 (first motor generator shaft) and a vertical line representing the ring gear 8 (second motor generator shaft and output shaft). When an interval between the vertical line indicating the sun gear 7 and the vertical line indicating the carrier 9 is "1", an interval between the vertical line indicating the carrier 9 and the vertical line indicating the ring gear 8 is an interval equivalent to a gear ratio ρ. Note that the gear ratio ρ is a ratio between the number of teeth of the sun gear 7 and the number of teeth of the ring gear 8 in the planetary gear mechanism constituting the power split mechanism 4. The distance from the base line on the line indicating each of the rotating elements indicates the rotation speed of each of the rotating elements, and a line connecting points each indicating the rotation speed of each of the rotating elements is a straight line. Note that the arrows in FIG. 2 each indicate the directions of the torque of each of the rotating elements.

The alignment chart illustrated in FIG. 2 indicates an operation state in the hybrid traveling mode. In the hybrid traveling mode, the vehicle travels mainly using the power of the engine 1. That is, the engine 1 outputs a required engine torque Te_req according to a required driving force. In this case, the first motor generator 2 functions as a generator, outputs a torque in the direction opposite to the rotation direction of the engine 1 (negative rotation direction), and serves as a reaction force receiver that supports a reaction force of the requested engine torque Te_req.

The relationship between maximum torque Te_max that can be output by the engine 1 and maximum torque Tg_max that can be output by the first motor generator 2 in the power train illustrated in FIG. 1 is set so that torque acting on the carrier 9 in a case where the maximum torque Te_max that can be output by the engine 1 is output when an engine rotation speed Ne is increased based on an acceleration request is larger than torque acting on the carrier 9 in a case where the maximum torque Tg_max that can be output by the first motor generator 2 is output when the engine rotation speed Ne is increased based on the acceleration request. When the relationship between the maximum torque Te_max of the engine 1 and the maximum torque Tg_max of the first motor generator 2 is expressed by a mathematical expression in consideration of the gear ratio ρ, Equation (1) below can be obtained.

$$Te\_max > \{(1+\rho)/\rho\} \times Tg\_max \qquad (1)$$

Note that the torque increase for increasing the output torque of the engine 1 is performed by, for example, a supercharger 21. As the supercharger 21, a mechanical supercharger (supercharger) driven by the power of the output shaft 1a of the engine 1 or an exhaust type supercharger (turbocharger) driven by the kinetic energy of exhaust gas can be used.

The hybrid traveling mode in the hybrid vehicle Ve is a traveling mode in which the hybrid vehicle Ve is caused to travel mainly using the engine 1 as a power source as described above. Specifically, by connecting the engine 1 and the power split mechanism 4, the power output from the engine 1 can be transmitted to the drive wheel 6. As described above, when the power output from the engine 1 is transmitted to the drive wheel 6, the reaction force from the first motor generator 2 is applied to the power split mechanism 4. Therefore, the sun gear 7 in the power split mechanism 4 is caused to function as a reaction force element so that the torque output from the engine 1 can be transmitted to the drive wheel 6. That is, the first motor generator 2 outputs a reaction force torque corresponding to the required engine torque Te_req in order to apply a torque corresponding to the required engine torque Te_req based on the acceleration request to the drive wheel 6.

In addition, the first motor generator 2 can arbitrarily control the rotation speed according to the value of the supplied current and the frequency thereof. Therefore, the engine rotation speed Ne can be arbitrarily controlled by controlling the speed of the first motor generator 2. Specifically, the required driving force is obtained according to the accelerator opening, the vehicle speed and the like, which are determined by a depression amount of an accelerator pedal by a driver. Further, the required power Pe_req of the engine 1 is obtained based on the required driving force. Further, the required engine torque Te_req required by a driver is obtained from the required power Pe_req of the engine 1 and the current engine rotation speed Ne. Then, the operating point of the engine 1 is determined from the optimal fuel efficiency line at which the fuel efficiency of the engine 1 becomes good. Further, the rotation speed of first motor generator 2 is controlled so as to obtain the operating point of engine 1 determined as described above. That is, according to the torque transmitted from the engine 1 to the power split mechanism 4, the torque Tg or the rotation speed of the first motor generator 2 is controlled. Specifically, the rotation speed of first motor generator 2 is controlled so that the engine rotation speed Ne is controlled to a target engine rotation speed Ne_req. In this case, since the rotation speed of the first motor generator 2 can be continuously changed, the engine rotation speed Ne can also be continuously changed.

As described above, the engine rotation speed Ne is controlled by the first motor generator 2, and the torque Tg of the first motor generator 2 is controlled according to the required engine torque Te_req. In this case, the first motor generator 2 functions as a reaction force element as described above. Further, the control of the engine rotation speed Ne requests inertia torque Tg_iner for increasing the engine rotation speed Ne by, for example, an acceleration request. In this case, the inertia torque Tg_iner is a positive value (Tg_iner>0). Specifically, the engine rotation speed Ne is increased in a state where the current actual engine rotation speed Ne is lower than the target engine rotation speed Ne_req. Then, the inertia torque Tg_iner is covered by any one of the driving power sources of the engine 1, the first motor generator 2, and the second motor generator 3.

For example, in the case of steady traveling or a request for smooth acceleration, the first motor generator 2 controls the engine rotation speed Ne as described above. That is, the inertia torque Tg_iner for maintaining or smoothly increasing the engine rotation speed Ne is output by the first motor generator 2. Therefore, the torque Tg output from the first motor generator 2 can be expressed as Equation (2) below.

$$Tg = -\{\rho/(1+\rho)\} \times Te\_req + Tg\_iner \qquad (2)$$

Note that "$-\{\rho/(1+\rho)\} \times Te\_req$" in Equation (2) above indicates the above-described reaction force torque. Further, the relationship between pieces of torque of the respective rotating elements in the planetary gear mechanism constituting the power split mechanism 4 described above is determined based on the gear ratio ρ (ratio between the number of teeth of the sun gear 7 and the number of teeth of the ring gear 8). Therefore, the torque Tg output by the first motor generator 2 can be obtained using Equation (2) above.

On the other hand, when the acceleration request is relatively large, for example, in a case of rapid acceleration as described above, the inertia torque Tg_iner required to increase the engine rotation speed Ne increases. Therefore, when the engine rotation speed Ne is controlled by the first motor generator 2 as described above, the required engine torque Te_req is not output from the drive wheel 6, and a driver may not be able to obtain a feeling of acceleration intended by the driver. Therefore, in the present embodiment, when the acceleration request is large, for example, in a case of rapid acceleration, in addition to the required engine torque Te_req, an inertia torque Te_iner for increasing the engine rotation speed Ne is also output by the engine 1. Note that this inertia torque Te_iner is an inertia torque converted to the shaft torque of the engine 1, and can be converted by Equation (3) below from the relationship with the gear ratio ρ of the planetary gear mechanism constituting the power split mechanism 4.

$$Te\_iner = \{(1+\rho)/\rho\} \times Tg\_iner \qquad (3)$$

Therefore, in the following description, when the inertia torque is output by the engine 1, it is indicated as "inertia torque Te_iner", and when it is output by the first motor generator 2, it is indicated as "inertia torque Tg_iner".

The relationship between the maximum torque Te_max that can be output by the engine 1 and the maximum torque Tg_max that can be output by the first motor generator 2 in the power train illustrated in FIG. 1 is set so that torque acting on the carrier 9 in a case where the maximum torque Te_max that can be output by the engine 1 is output when an engine rotation speed Ne is increased based on an acceleration request is larger than torque acting on the carrier 9 in a case where the maximum torque Tg_max that can be output by the first motor generator 2 is output when the engine rotation speed Ne is increased based on the acceleration request. That is, in the present embodiment, as described above, when the acceleration request is large, for example, in a case of rapid acceleration, the required engine torque Te_req and the inertia torque Te_iner are output by the engine 1. Therefore, the maximum torque Te_max of the engine 1 is set so that at least torque in consideration of the inertia torque Te_iner in addition of the maximum torque Tg_max that can be output by the first motor generator 2 can be output.

When the relationship between the maximum torque Te_max of the engine 1 and the maximum torque Tg_max of the first motor generator 2 is expressed by a mathematical expression in consideration of the gear ratio ρ, Equation (4) below can be obtained.

$$Te\_max > \{(1+\rho)/\rho\} \times Tg\_max \qquad (4)$$

Note that the torque increase for increasing the output torque of the engine 1 is performed by, for example, a supercharger 21. As the supercharger 21, a mechanical supercharger (supercharger) driven by the power of the output shaft 1a of the engine 1 or an exhaust type supercharger (turbocharger) driven by the kinetic energy of exhaust gas can be used.

Next, an example of control performed by the ECU 20 to compute an engine torque Te_cmd that is actually commanded to the engine 1 will be described.

First, the ECU 20 obtains the required power Pe_req of the engine 1. The required power Pe_req of the engine 1 is obtained from the required driving force obtained based on the accelerator opening and the vehicle speed determined by the depression amount of the accelerator pedal by a driver, and is determined, for example, by referring to a prepared map or the like.

Next, the ECU 20 obtains the required engine torque Te_req. The required engine torque Te_req is, for example, an engine torque required by a driver, and is a value obtained based on an operation amount of the accelerator pedal by the driver and the like. Therefore, it can be obtained from the required driving force and the current engine rotation speed Ne.

Next, the ECU 20 calculates the inertia torque Tg_iner. As described above, the inertia torque Tg_iner is a torque required when the engine rotation speed Ne is increased based on the acceleration request, and specifically, is a torque for changing the rotation speeds of the engine 1 and the first motor generator 2. The computation of the inertia torque Tg_iner can be performed by feedback control and feedforward control. The feedback control is performed based on a deviation between the actual engine rotation speed Ne in the current routine and the target engine rotation speed Ne_req in the current routine. Further, the feedforward control is performed based on a deviation between the target engine rotation speed Ne_req in the current routine and a target engine rotation speed Ne_req+1 after one routine. That is, the inertia torque Tg_iner can be obtained from the feedback torque Tg_fb in the feedback control and the feedforward torque Tg_ff in the feedforward control. Therefore, the inertia torque Tg_iner can be expressed by Equation (5) below.

$$Tg\_iner = Tg\_fb + Tg\_ff \tag{5}$$

Note that the feedforward torque Tg_ff is obtained by multiplying an increase dNe of the target engine rotation speed Ne_req to be increased during one routine by an inertia moment Ie of the engine 1 and the first motor generator 2, and further multiplying a shaft torque of the engine 1 by a conversion coefficient K for converting to a shaft torque of the first motor generator 2. This can be simply expressed as Equation (6) below.

$$Tg\_ff = Ie \times K \times dNe/dt \tag{6}$$

Note that, in Equation (5) above, the influence on the rotation fluctuation of the rotation shaft of the second motor generator 3 is relatively small, and is not considered.

Next, it is determined whether the calculated inertia torque Tg_iner is larger than a preset threshold α As described above, this is to determine whether the inertia torque Tg_iner when the engine rotation speed Ne is controlled by the first motor generator 2 is larger than the threshold α, in other words, to determine whether the acceleration request is relatively large, for example, there is rapid acceleration. Therefore, the threshold α is set to, for example, the value of the inertia torque Tg_iner required to increase the change rate of the engine rotation speed Ne. Note that the threshold α is not limited to the case where the acceleration request is relatively large, for example, in a case of rapid acceleration, and may be applied to the case where there is at least an acceleration request and the engine rotation speed Ne is increased regardless of the magnitude of the acceleration request. Therefore, the threshold α is appropriately set according to the magnitude of the acceleration request, various vehicles and the like, and the value of the threshold α is set to at least 0 or more.

If the value of the inertia torque Tg_iner is larger than the threshold α due to a large change rate of the engine rotation speed Ne etc., the engine torque Te_cmd actually commanded to the engine 1 commands a total torque obtained by adding the required engine torque Te_req and the inertia torque Te_iner converted to the engine shaft. Therefore, when the engine torque Te_cmd actually commanded to the engine 1 can be simply expressed as Equation (7) below.

$$Te\_cmd = Te\_req + Te\_iner \tag{7}$$

On the other hand, when the value of the inertia torque Tg_iner is equal to or smaller than the threshold a, the required engine torque Te_req is commanded as the engine torque Te_cmd actually commanded to the engine 1. Therefore, when the engine torque Te_cmd actually commanded to the engine 1 can be expressed as Equation (8) below.

$$Te\_cmd = Te\_req \tag{8}$$

Note that the above-described control is repeatedly executed, for example, every predetermined time, and the one routine corresponds to the "predetermined time".

Here, in the present embodiment, an NV (Noise Vibration) restriction region which is a range of the engine rotation speed Ne and the engine torque Te in which gear rattling noise may be generated as a loud noise between the gears of the planetary gear mechanism constituting the power split mechanism 4 through experiments and the like is preset through experiments and the like. If the ECU 20 determines that the engine rotation speed Ne and the engine torque Te satisfy the NV requirement such that the values are within the NV restriction region, the ECU 20 can execute the control of limiting the torque of the engine 1 to reduce the abnormal noise.

On the other hand, when a user requests rapid acceleration of a predetermined value or more, in a situation where the first motor generator 2 does not output the reaction force torque, during engine rotation speed increase control of increasing the engine rotation speed Ne, it is possible to relax or cancel the engine torque limitation due to the NV requirement. With this, it is possible to suppress a delay in increasing the engine rotation speed Ne due to the NV restriction region. Note that when the engine torque limitation is relaxed, the limitation amount of the engine torque Te is changed using at least one of the magnitude of the assist torque of the first motor generator 2, the time required to pass through the NV restriction region, and the range of the engine rotation speed Ne for passing through the NV restriction region.

Figure 3:
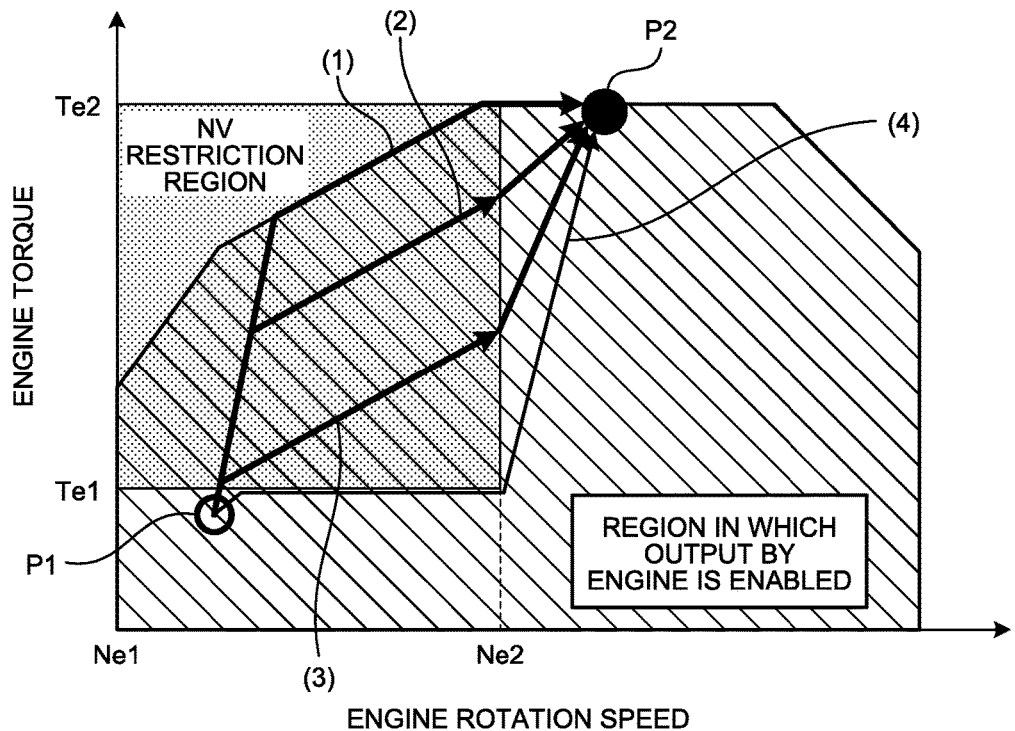
FIG. 3 is a diagram illustrating a transition image of an engine operating point during engine rotation speed increase control.

FIG. 3 is a diagram illustrating a transition image of an engine operating point during engine rotation speed increase control. Note that, in FIG. 3, the range from an engine rotation speed Ne1 to an engine rotation speed Ne2 (Note: Ne1<Ne2), and the range of the engine torque Te on the vertical axis from an engine rotation speed Te1 to an engine rotation speed Te2 (where Te1<Te2) correspond to the NV restriction region. Further, in FIG. 3, the point P1 is a current operating point of the engine 1, and the point P2 is a target operating point of engine 1.

In FIG. 3, when the engine torque limitation due to the NV requirement is canceled during the engine rotation speed increase control, the transition of the engine operating point passing through the NV restriction region as indicated by (1) in FIG. 3 is exhibited. Further, when the engine torque limitation due to the NV requirement is relaxed during the engine rotation speed increase control, the transitions of the engine operating points passing through the NV restriction region as indicated by (2) and (3) in FIG. 3 are exhibited according to the amount of relaxation of the torque limitation. On the other hand, when the normal engine torque limitation due to the NV requirement is performed during the engine rotation speed increase control, the transition of the engine operating point which does not pass through the NV restriction region as indicated by (4) in FIG. 3 is exhibited.

Figure 4:
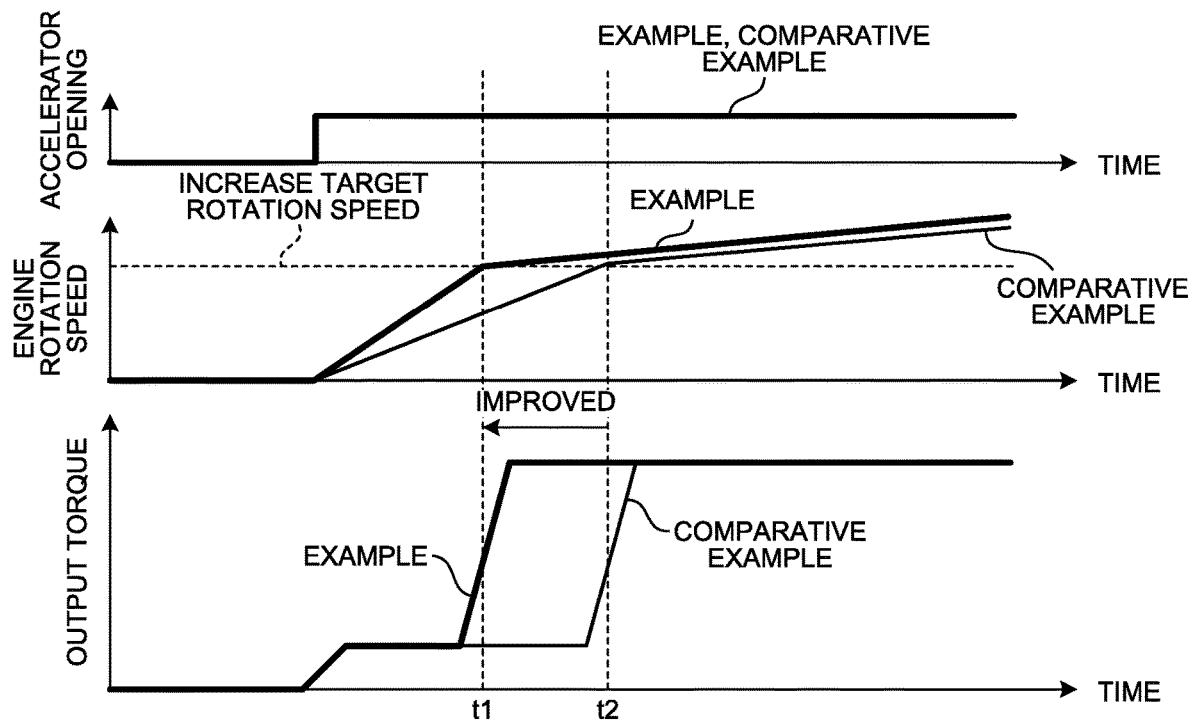
FIG. 4 is a time chart illustrating an example of changes in an accelerator opening, an engine rotation speed, and output torque (driving force) for driving a drive wheel.

FIG. 4 is a time chart illustrating an example of changes in the accelerator opening, the engine rotation speed Ne, and the output torque (driving force) for driving the drive wheel 6. Note that, in FIG. 4, "Example" corresponds to a case where the engine torque limitation due to the NV requirement is relaxed during the engine rotation speed increase control, and "Comparative Example" corresponds to a case where the normal engine torque limitation due to the NV requirement is performed during the engine rotation speed increase control.

As illustrated in FIG. 4, in Example and Comparative Example, the timing at which the accelerator opening sharply increases due to the acceleration request from a user is the same, and the increase in the engine rotation speed Ne due to the start of the engine rotation speed increase control is also the same timing. On the other hand, as illustrated in FIG. 4, the time until the engine rotation speed Ne reaches the increase target rotation speed in the engine rotation speed increase control is time t2 in Comparative Example, and is time t1 in Example which is earlier than the time t2. Therefore, as illustrated in FIG. 4, in Example, the output torque can be increased earlier than in Comparative Example, and the acceleration responsiveness can be improved.

Figure 5:
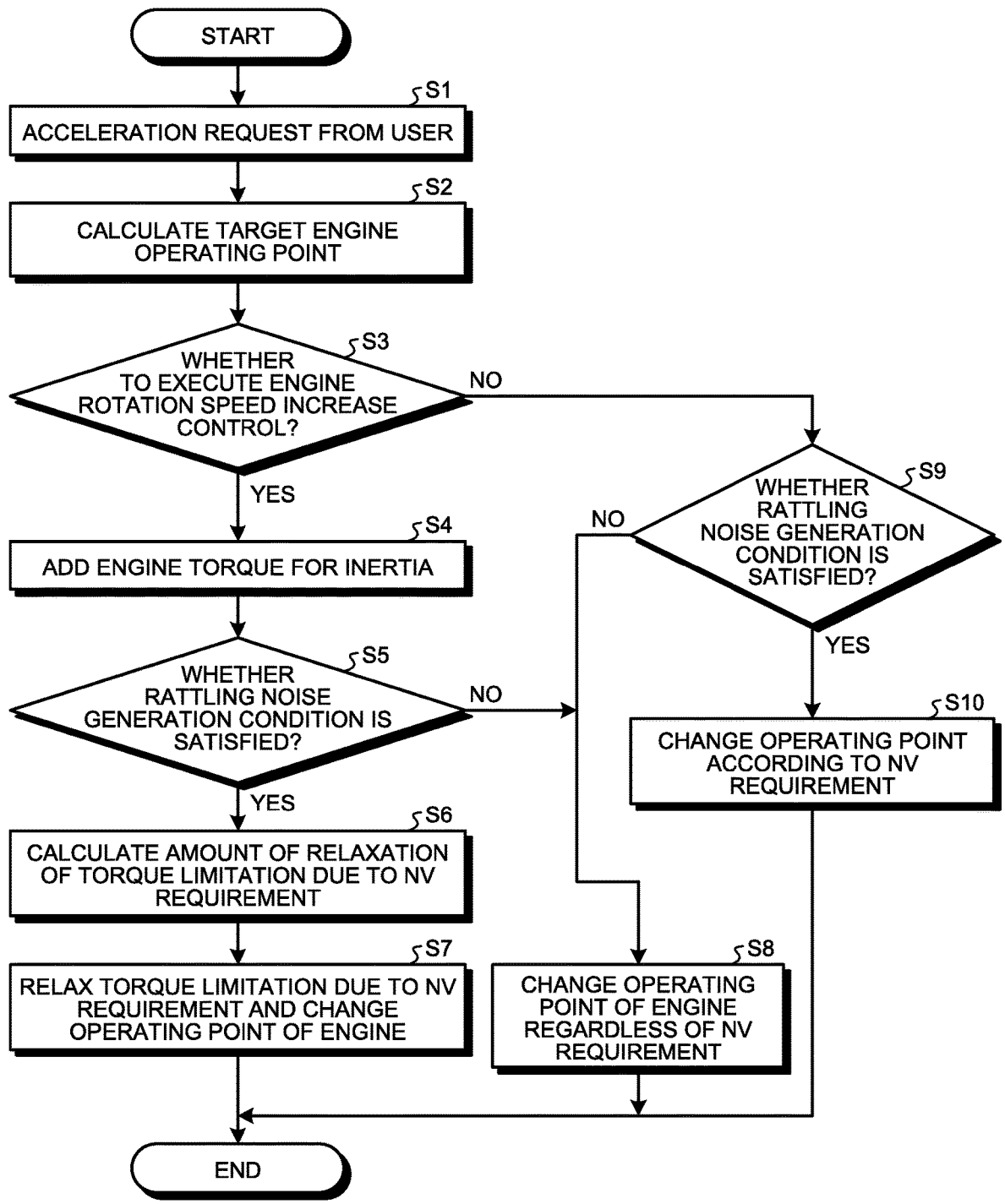
FIG. 5 is a flowchart illustrating an example of control in a case where torque limitation due to an NV requirement is relaxed during engine rotation speed increase control.

FIG. 5 is a flowchart illustrating an example of control in a case where the torque limitation due to the NV requirement is relaxed during the engine rotation speed increase control.

First, when receiving an acceleration request from a user (step S1), the ECU 20 calculates a target engine operating point (step S2). Next, the ECU 20 determines whether to execute the engine rotation speed increase control (step S3). When it is determined that the engine rotation speed increase control is to be performed (Yes in step S3), the ECU 20 adds the engine torque for the inertia torque to the required engine torque Te_req as the engine torque Te_cmd actually commanded to the engine 1 (step S4).

Then, the ECU 20 determines whether the engine rotation speed Ne and the engine torque Te satisfy the NV requirement, in other words, whether the rattling noise generation condition is satisfied (step S5). When it is determined that the rattling noise generation condition is satisfied (Yes in step S5), the ECU 20 calculates the amount of relaxation of the torque limitation due to the NV requirement (step S6), relaxes the torque limitation due to the NV requirement, changes the operating point of the engine 1 (step S7), and ends a series of controls. On the other hand, when it is determined that the rattling noise generation condition is not satisfied (No in step S5), the ECU 20 changes the operating point of the engine 1 regardless of the NV requirement (step S8), and ends a series of controls.

When it is determined in step S3 that the engine rotation speed increase control is not to be performed (No in step S3), the ECU 20 determines whether the rattling noise generation condition is satisfied (step S9). When it is determined that the rattling noise generation condition is satisfied (Yes in step S9), the operating point of the engine 1 is changed according to the NV requirement (step S10), and a series of controls is ended. On the other hand, when it is determined that the rattling noise generation condition is not satisfied (No in step S9), the ECU 20 changes the operating point of the engine 1 regardless of the NV requirement (step S8), and a series of controls is ended.

Figure 6:
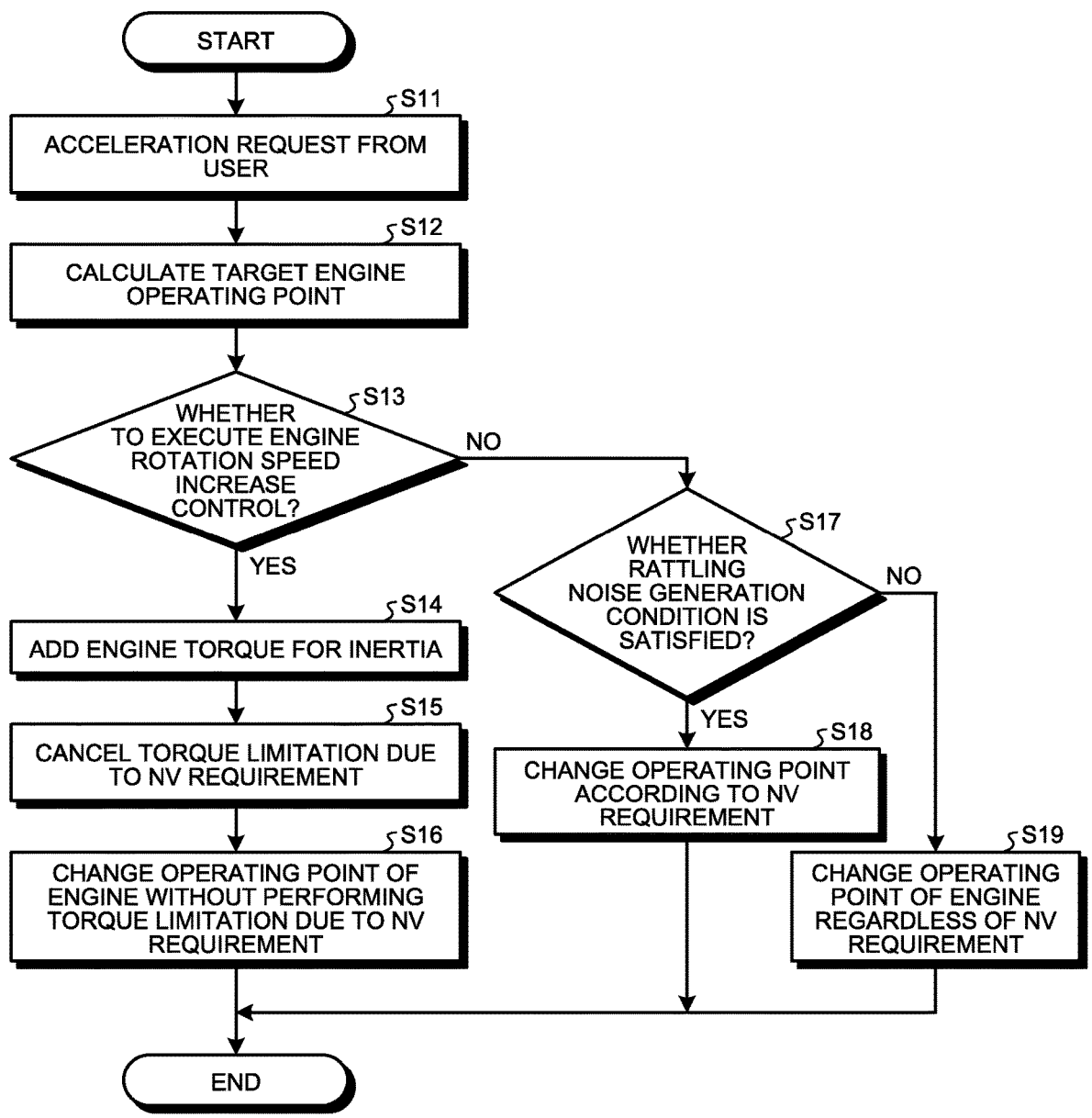
FIG. 6 is a flowchart illustrating an example of control in a case where the torque limitation due to the NV requirement is canceled during the engine rotation speed increase control.

FIG. 6 is a flowchart illustrating an example of control in a case where the torque limitation due to the NV requirement is canceled during the engine rotation speed increase control.

First, when receiving an acceleration request from a user (step S11), the ECU 20 calculates a target engine operating point (step S12). Next, the ECU 20 determines whether to execute the engine rotation speed increase control (step S13). When it is determined that the engine rotation speed increase control is to be performed (Yes in step S13), the ECU 20 adds the engine torque for the inertia torque to the required engine torque Te_req as the engine torque Te_cmd actually commanded to the engine 1 (step S14). Then, the ECU 20 cancels the torque limitation due to the NV requirement (step S15), changes the operating point of the engine 1 without performing the torque limitation due to the NV requirement (step S16), and ends a series of controls.

When it is determined in step S13 that the engine rotation speed increase control is not to be performed (No in step S13), the ECU 20 determines whether the rattling noise generation condition is satisfied (step S17). When it is determined that the rattling noise generation condition is satisfied (Yes in step S17), the operating point of the engine 1 is changed according to the NV requirement (step S18), and a series of controls is ended. On the other hand, when it is determined that the rattling noise generation condition is not satisfied (No in step S17), the ECU 20 changes the operating point of the engine 1 regardless of the NV requirement (step S19), and ends a series of controls.

Further, the control described in the present embodiment is particularly effective because there is a need to quickly increase the engine rotation speed Ne so as to rotate a turbine of the supercharger 21 in a system in which the engine 1 including the supercharger 21 is combined as in the hybrid vehicle Ve according to the present embodiment.

INDUSTRIAL APPLICABILITY

According to the present invention, it is possible to provide a hybrid vehicle capable of suppressing a delay in increasing the engine rotation speed due to the NV restriction region.

| Reference Signs List | |
|---|---|
| 1 | Engine |
| 2 | First motor generator |
| 3 | Second motor generator |
| 4 | Power split mechanism |
| 5 | Drive shaft |
| 6 | Drive wheel |
| 20 | ECU |
| 21 | Supercharger |
| Ve | Hybrid vehicle |

The invention claimed is:

1. A hybrid vehicle comprising:
an engine;
an output member that transmits a driving force to a drive wheel;
a rotating electric machine;
a power split mechanism that splits and transmits the driving force output from the engine to the output member and the rotating electric machine,
the power split mechanism including at least three rotating elements of an input element connected to the engine, a reaction force element connected to the rotating electric machine, and an output element connected to the output member; and a processor that is configured to:
   output via the rotating electric machine a reaction force torque corresponding to required engine torque based on an acceleration request in order to apply a torque corresponding to the required engine torque to the drive wheel,
   execute, in a situation where the rotating electric machine does not output the reaction force torque, engine rotation speed increase control of increasing an engine rotation speed, and
   execute an engine torque limitation due to a noise vibration requirement that is set based on a combination of the engine rotation speed and an engine torque, wherein the engine torque limitation due to the noise vibration requirement is relaxed during the engine rotation speed increase control.

2. The hybrid vehicle according to claim 1, wherein the engine includes a supercharger, and wherein the processor is configured increase an output torque of the engine by operating the supercharger.

\* \* \* \* \*